Nov. 19, 1968 R. L. GELTING 3,411,951
POWER SUPPLY COMPRISING IN COMBINATION A
FUEL CELL STACK AND A HUMIDITY
EXCHANGE/SCRUBBER UNIT
Filed Oct. 15, 1965
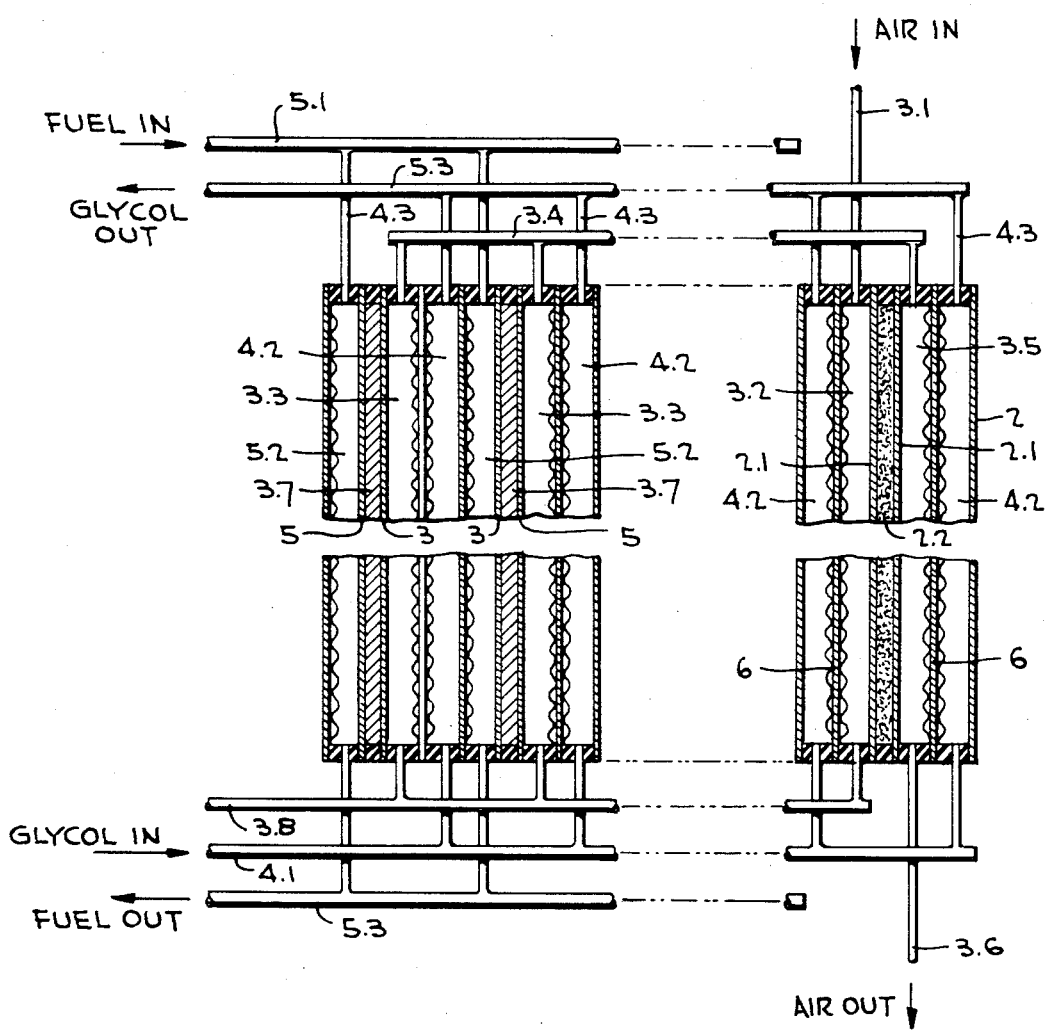
Raymond L. Gelting,
INVENTOR United States Patent Office 3,411,951
Patented Nov. 19, 1968

3,411,951
POWER SUPPLY COMPRISING IN COMBINATION A FUEL CELL STACK AND A HUMIDITY EXCHANGE SCRUBBER UNIT
Raymond L. Gelting, Manchester, Conn., assignor to United Aircraft Corporation, East Hartford, Conn., a corporation of Delaware
Filed Oct. 15, 1965, Ser. No. 496,566
5 Claims. (Cl. 136—86)

ABSTRACT OF THE DISCLOSURE

A power supply comprising in combination a plurality of fuel cells each comprising a fuel electrode, an oxidizing electrode, and an electrolyte positioned between said electrodes and in contact therewith, and a humidity exchange/scrubber unit comprising a humidity exchange/scrubber chamber containing a humidity exchange/scrubber material is described. In operation, ambient air is preconditioned in the humidity exchange/scrubber unit before being fed to the fuel cell for consumption.

---

The present invention relates to fuel cells for the electrochemical generation of electricity wherein the overall cell reaction is the oxidation of a fuel by oxygen, or by an oxygen-containing gas such as air. More particularly, the invention relates to a process and fuel cell construction, primarily for operation with air as the oxidant, for preconditioning of the oxidant employed in the fuel cell.

A fuel cell of the type with which this invention is concerned produces an electro-motive force by bringing an oxidizing gas and a fuel gas in contact with two suitable electrodes and an electrolyte without mixing the gases. The gaseous fuel such as hydrogen gas is introduced at one electrode where it reacts electrochemically with the electrolyte to impart electrons to the electrode. Simultaneously, a gaseous oxidant such as air is introduced to the second electrode where it reacts electrochemically with the electrolyte to consume electrons at the electrode. Connecting the two electrodes by an external circuit causes an electrical current to flow in the circuit and withdraws electrical power from the cell. The over-all fuel cell reaction produces electrical energy which is the sum of the separate half-cell reactions. A by-product of the reaction is formed as well as some heat.

In the development of a commercial fuel cell, the stacking of numerous fuel cell units in a battery has been suggested. Preferably, these batteries are compact and made of lightweight materials in order to provide a high energy to density ratio. Such cells can comprise two thin lightweight electrodes containing a trapped or free-flowing electrolyte therebetween. The critical dimension of such a cell, i.e., the thickness of the electrolyte vehicle, varies from 0.010 to 0.030 inch with the overall cell pitch being as small as 5–10 cells per inch. It is desirable to employ air as the oxidant, rather than pure oxygen, from an economic standpoint. However, the carbon dioxide in the air must be removed, i.e., "scrubbed," in any fuel cell employing a carbonate forming electrolyte. Furthermore, when air is introduced from the ambient atmosphere, particularly in cold, dry regions, in view of the thinness of the electrodes, the water of the electrolyte is sucked from the electrolyte compartment through the electrodes and adsorbed by the incoming air. Withdrawal of water from the electrolyte is particularly noticeable in the region immediately adjacent the air inlet. The depletion of the water within the electrolyte reduces the efficiency of the cell in that the electrolytic conductivity is lowered and the tendency for gas crossover is increased. Furthermore, in fuel cells employing a trapped electrolyte, the removal of the water from the matrix, and consequent drying, can cause damage to the matrix. Moreover, since the wetness of the ambient air varies, the overall cell performance is subject to variation. If the $CO_2$ is not removed from the incoming air, it forms a carbonate ($K_2CO_3$ in the case of a KOH electrolyte). This new ternary mixture is less effective as an electrolyte. Furthermore, there is a tendency for crystallization of the compound, particularly at the relatively dry or hot spots. This crystallization can easily plug up the inlet ports and prevent further reactant flow.

Accordingly, it is an object of the present invention to provide a fuel cell stack for operation on ambient air with means for preconditioning the air before it is brought in contact with the electrodes of the cell.

It is a further object of the present invention to remove carbon dioxide from the ambient air to provide more effective fuel cell operation with a carbonate forming electrolyte.

It is a further object of the present invention to integrate the preconditioning of the air that supplies oxygen to the fuel cell oxidizing electrode with the fuel cell heat removal system.

It is another object of the present invention to provide a fuel cell construction with means for pre-conditioning the air supply to minimize dehydration of the cell electrolyte.

It is a further object of the present invention to provide a fuel cell battery employing a plurality of individual fuel cell units in combination with a humidity exchange/scrubber unit permitting the operation of the cell on ambient air.

Further objects, features, and advantages of the invention will become apparent from the following description with particular emphasis being placed on the drawing.

In accordance with the present invention, a humidity exchange/scrubber unit is employed as an integral part of a fuel cell stack comprising a plurality of individual fuel cells. For example, a fuel cell stack comprising 12 or more individual, single cells is operably associated with one humidity exchange/scrubber unit. In operation, ambient air, as the oxidant, is not fed directly to the fuel cells for consumption, but is fed into the humidity exchange/scrubber unit and thereafter, upon being preconditioned, is fed to the individual fuel cells.

The humidity exchange/scrubber unit comprises a chamber containing a humidity exchange/scrubber fluid in contact at each major surface, through a water-permeable membrane, with an air chamber. Each air chamber in turn is adjacent a heat-exchange chamber. Ambient air is fed to the humidity exchange/scrubber unit where it is preconditioned as to moisture content, and its heat content raised to substantially the operating temperature of the cell, before it is fed through suitable manifold means to the individual fuel cells. In a similar manner, a heat-exchange fluid is circulated through the humidity exchange/scrubber unit and through a chamber in each individual fuel cell of the stack separating the oxidant and fuel compartments of the cell. Thus, the circulation of the heat exchange fluid maintains the humidity exchange/scrubber unit and the individual fuel cells at the same or substantially the same temperature or at whatever relative temperatures are most advantageous for the most efficient humidifying and scrubber action.

In order to more specifically demonstrate the invention, reference is made to the accompanying drawing which is an overall plan view in cross-section of part of a fuel cell stack in conjunction with a humidity exchange/scrubber unit.

In the drawing, the fuel cell stack preferably will comprise about 12 or more individual fuel cells, only two of which are shown, in combination with one humidity exchange/scrubber unit. Each fuel cell will comprise an electrolyte 3.7, an anode 5, and a cathode 3. A fuel compartment 5.2 will be adjacent each anode and an oxidant compartment 3.3 adjacent each cathode. A heat exchange chamber 4.2 will separate the oxidant and fuel compartments. The humidity exchange/scrubber unit 2 servicing the entire stack will comprise an air inlet 3.1 entering compartment 3.2 and air outlet 3.6 leading from compartment 3.5. Additionally, the module will contain fluid exchange passages 4.2. The air chambers will be separated from a suitable moisture exchange fluid, such as an alkali hydroxide, 2.2 by water-permeable membranes 2.1. In operation, ambient air is passed into compartment 3.2 through inlet 3.1. The ambient air will adsorb moisture from and reject $CO_2$ to the fluid in the chamber 2.2 as it passes through the chamber and at the same time will be brought up to substantially the operating temperature of the cell as a result of the adjacent heat exchange chamber 4.2. The pre-conditioned air is then passed by manifold means 3.8 to the several fuel cells of the stack. The pre-conditioned air enters the lower part of the fuel cell and, as it passes through the oxidant compartment, collects water of reaction from the fuel cell so that at its exit point it is substantially richer in water than at the time it entered the fuel cell module. This moisture-rich water is circulated to the humidity exchange/scrubber unit adjacent the humidity exchange medium. In passing through the unit, some of the water is adsorbed through membrane 2.1 by the humidity-exchange fluid 2.2 before the air is passed into the atmosphere at exit 3.6. In this manner, the water of the reaction of the fuel cell is conveniently transferred with a minimum of ancillary equipment. As is apparent the water in the fuel cell and humidity exchange/ scrubber unit tends to be self balancing, regardless of changes in the moisture content of ambient air. Thus, under high humidity conditions, more water is absorbed from the incoming air, whereas under low humidity conditions less air is taken from the system.

In the embodiment shown in the drawing, the fuel employed is passed into inlet 5.1 to chamber 5.2 and impurities vented at 5.3. Further, the heat exchange medium is continuously flowed through chamber 4.2 of the humidity exchange/scrubber unit and each fuel cell.

As is apparent from the drawing, any number of fuel cell modules can be contained in any stack depending upon the current and voltage characteristics needed to fulfill the ultimate purpose.

In the fuel cell stack of the present invention, electrodes of the fuel cell preferably are highly porous, lightweight structures which comprise a catalytic metal bonded to a conductive support such as a metal screen, mesh or felt with a hydrophobic plastic binder. However, other electrodes can also be employed including the non-porous Pd-Ag alloy structures described in Oswin, U.S. Patent No. 3,092,517. The electrolyte is preferably trapped in a suitable asbestos, ceramic, polymer or the like matrix. Further, a free-flowing electrolyte can be used. However, in the event a free-flowing electrolyte is employed with a lightweight electrode, it is desirable, if not essential, to have a hydrophobic film as part of the electrode structure separating the reactant compartment from the electrolyte compartment. In this manner, the reaction interface of electrode, electrolyte, and reactant gas is more readily controlled.

The non-porous separator 6 separating the reactant compartments from the heat-exchange compartment can be any suitable material which has good heat-exchange properties. Suitable materials include nickel, copper, tantalum, iron and alloys thereof. Preferably, the separator will have a high surface area in order that the heat exchange is as efficient as possible. For this reason, a corrugated, dimpled or etched plate is desirable.

The humidity exchange/scrubber medium can be any material which readily releases and takes up water. Preferably, however, the electrolyte of the fuel cell and the aforesaid medium are the same material, or the vapor pressure of the materials are substantially the same. Because of its exceptional characteristics in the aforesaid areas, alkali hydroxides such as sodium and potassium hydroxide are eminently suitable. Other materials can be employed, however, such as calcium hydroxide, barium hydroxide, strontium hydroxide, and the alkaline carbonates. The heat-exchange medium is not critical and can be substantially any material having good heat-transfer properties. Again, because of its exceptional properties in this area and its availability, ethylene glycol is preferred. Other materials which can be employed include glycerol, propylene glycol and the like. The water-permeable membranes 2.1, employed in the humidity exchange module, can be substantially any material which will withstand the corrosive environment of the humidity exchange/scrubber medium and which will permit the passage of water at the operating conditions of the cell. Suitable materials are porous polyvinylalcohol, polyvinylchloride ion-exchange resins, asbestos and the like.

Utilizing a laminated fuel cell construction, an individual cell can be produced which has an overall cell pitch of about 5 to 10 cells per inch. By providing a stack of parallel connected cells and then connecting a number of stacks in series, any desired high voltage can be achieved. Indicative of the capacity of the cells embodying the invention, the following is cited: Twelve individual cells having a combined reducing electrode area of 675 square inches, and using a combined oxidizing electrode area of 675 square inches, a 30 percent aqueous KOH electrolyte impregnated on an asbestos matrix, has a voltage of about 10 volts. A stack of such cells can deliver a current of 80 to 100 amperes at such voltage for 100 hours.

The present invention resides in the method of and construction of a combination of components for integrating the pre-conditioning of the air supply with the temperature gradient established across the electrodes of the fuel cell stack to obtain uniform water transfer and the prevention of the de-hydration of the electrolyte of the cell. Moreover, carbon dioxide is removed from the air to prevent fouling of the cell when carbonate forming electrolytes are used. It will be apparent from the above description that the invention is not limited to the particular materials of the construction and that modifications may be made herein by one skilled in the art without departing from the scope of the invention disclosed. Such modifications and departures are to be covered herein with the invention only being limited in accordance with the appended claims.

It is claimed:

1. A power supply comprising in combination a plurality of fuel cells each comprising a fuel electrode, an oxidizing electrode, and an electrolyte positioned between said electrodes and in contact therewith, said electrodes adapted for selective electrical connection of said fuel cells; means for supplying a fuel to a fuel chamber adjacent said fuel electrode; means for supplying oxidant to an oxidant chamber adjacent said oxidizing electrode; means for removing excess fuel from said fuel chamber; means for removing excess oxidant from said oxidizing chamber; a heat exchange chamber containing a heat exchange fluid interposed between said fuel and oxidant chambers of adjacent cells of said plurality of cells; a humidity exchange/scrubber unit comprising an air inlet chamber, an air outlet chamber; a humidity exchange/scrubber chamber containing a humidity exchange/scrubber material separating said air inlet and outlet chambers by means of water permeable partitions, and a heat exchange chamber adjacent each of said air chambers containing a heat exchange fluid; means for passing air from said inlet chamber of said humidity exchange/scrubber unit to each oxidant chamber of said plurality of fuel cells; means for passing air from said oxidant chamber of each of said plurality of fuel cells to said air outlet chamber of said humidity exchange/scrubber unit; and means for circulating a heat exchange fluid from each of said plurality of fuel cells to said humidity exchange/scrubber unit.

2. The power supply system of claim 1 wherein the thickness of the electrolyte vehicle is from 0.010 to 0.030 inch with the overall pitch of the cell being about 5 to 10 cells per inch.

3. The power supply system of claim 2 wherein the electrodes are light weight electrodes comprising a conductive support having a coating comprising a catalytic metal and hydrophobic binder.

4. The fuel cell of claim 3 wherein the heat exchange fluid is ethylene glycol.

5. The power supply of claim 4 wherein the humidity exchange scrubber medium is an alkali hydroxide.

References Cited
UNITED STATES PATENTS

| | | | |
|---|---|---|---|
| 2,275,281 | 3/1942 | Berl | 136—86 |
| 3,172,784 | 3/1965 | Blackman | 136—86 |
| 3,239,383 | 3/1966 | Hauel | 136—86 |

ALLEN B. CURTIS, *Primary Examiner.*